May 1, 1962 V. HANCOCK 3,031,926
PROCESS OF MAKING COLORED MULTI-FOCAL EYEGLASS LENS
Filed April 30, 1959
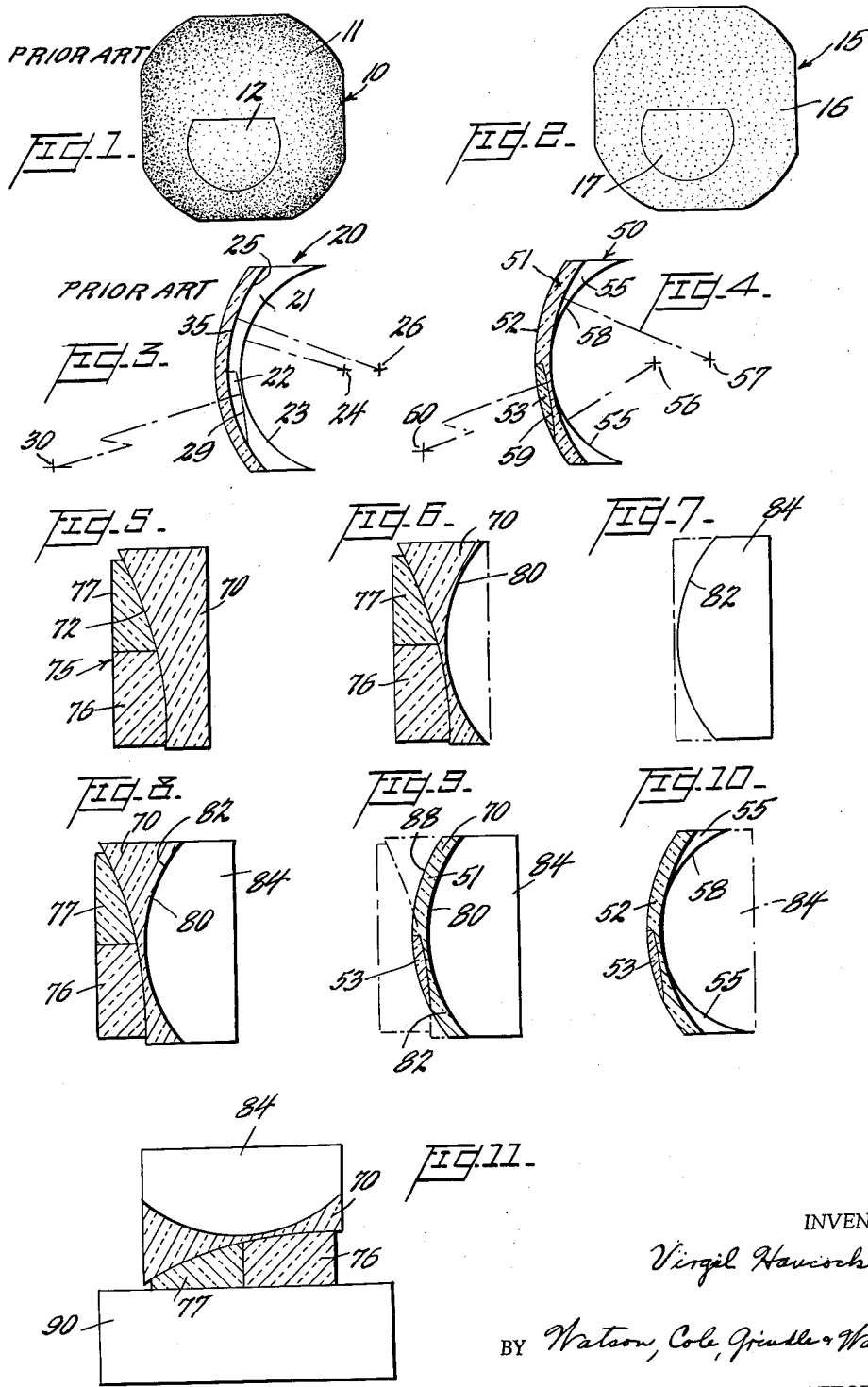
INVENTOR
Virgil Hancock
BY Watson, Cole, Grindle & Watson
ATTORNEY

United States Patent Office 3,031,926
Patented May 1, 1962

3,031,926
PROCESS OF MAKING COLORED MULTI-FOCAL EYEGLASS LENS
Virgil Hancock, Bellaire, Tex., assignor, by mesne assignments, to Textron, Inc., a corporation of Rhode Island
Filed Apr. 30, 1959, Ser. No. 809,985
3 Claims. (Cl. 88—54)

This invention relates to eyeglass lenses and more particularly to dark colored multifocal lenses which serve as light filters but which are also ground to fill the particular prescription for the wearer.

For outdoors wear, especially in the glare of the sun, or in connection with the treatment of certain pathological conditions, presbyopic eyeglass wearers frequently need dark colored filter lenses ground to conform to the requisite optical properties for their particular case.

Now the obvious approach would be merely to grind or construct the needed lenses wholly from dark colored glass of the appopriate index of refraction. However, difficulties present themselves in many instances due to the non-uniform thickness of the lenses, where the density of shading and filtering effect, and consequently the appearance of the glasses to others, will vary noticeably in areas from the center to the periphery of the lenses. When the prescription for distance vision is relatively weak, say from zero refracting power up to plus 2.00 or to minus 2.00 diopters, the concave and convex surfaces of the lenses will be approximately parallel, and the thickness of the lenses possibly about two millimeters or less; and as observed against the wearer's face, the colored lenses will present a uniform shade or density of coloring over the entire area of the lens.

However, when the prescription for distance vision is stronger, or where a substantial correction for astigmatism is included, each lens will vary considerably in thickness in different parts thereof (say about 1 millimeter at the center up to about 4 millimeters at the edge, or vice versa), this resulting in the colored lens appearing to differ in shade or density in the different areas of the lens. This renders the glasses unsightly in appearance and also subjects the wearer to a continually varying of filtering effect as his eye moves from point to point across the lens.

Thus, multifocal modifications of solid color glass lenses, beyond a certain refracting power are quite unsatisfactory.

The only solution to these difficulties which has heretofore been proposed has been to first make a white (i.e. a clear or colorless) partially-processed bifocal or trifocal lens, and to cement or fuse to the convex surface of this preliminary lens a colored lens of no power, but which has parallel convex and concave surfaces, the purpose being to cause the colored extra lens to present a uniform shade or density of color.

However, there is a serious disadvantage to the wearer of such a lens, due to the extreme unnecessary thickness thereof and the extra weight, which results from the colored extra lens being added to the thickness and weight of the white lens.

Thus, the principal object of the present invention is to provide a novel and improved multifocal uniformly tinted eyeglass lens which is of minimum thickness and weight for the purpose to be attained, and to provide a novel method of manufacturing such a lens.

The invention in its preferred embodiments contemplates the provision of a partially-processed multifocal lens made entirely out of colored glass which has a slightly higher softening point temperature than the white glass normally employed, this colored glass lens portion being composed of the necessary assembled portions of differing refractive properties, and ground according to the proper formula to afford the near-vision portion of the lens but leaving a distant-vision area of approximately no power and with substantially parallel convex and concave surfaces but with the precise thickness needed to produce the desired density or filtering effect approximating that of the near-vision lens portion. Then there is prepared, by novel steps afforded by the present invention, a white lens portion which complements the distance portion of the already ground partially-processed colored lens, to provide the proper power according to the desired prescription for distance vision.

Other objects and features of novelty will be apparent from the following specification when read in connection with the accompanying drawings in which certain embodiments of the invention are set forth by way of example.

In the drawings:
FIGURE 1 is a view in elevation of a bifocal lens ground from a solid piece of dark colored glass, and illustrating somewhat diagrammatically, by stippling, the wide variation in density and light transmission across the breadth of the lens;
FIGURE 2 is a similar view showing the uniformity of density of color in a bifocal lens afforded by the present invention;
FIGURE 3 is a view in vertical section through a multifocal lens illustrating a prior proposal looking toward the attainment of uniformity of density of color in such lenses;
FIGURE 4 is a similar view illustrating the solution afforded by the present invention;
FIGURE 5 is a view in vertical section through a partially-processed multifocal lens and representing an initial step in the present novel process;
FIGURE 6 is a similar view illustrating a subsequent step in the process;
FIGURE 7 is a vertical sectional view through a white, i.e. colorless, lens portion to be applied to the partially ground assembly of FIGURE 6;
FIGURE 8 is a similar view showing the parts of FIGURES 6 and 7 conjoined;
FIGURE 9 is a view of like nature showing the ground convex outer face of the lens;
FIGURE 10 is a similar view showing the ultimate concave grinding of the inner face of the lens assembly, this view illustrating the final step in the production of the novel lens shown in FIGURES 2 and 4; and
FIGURE 11 is a view partly in vertical section illustrating diagrammatically a step in the manufacture of a fused lens of the character described.

The lens illustrated rather diagrammatically in FIGURE 1 of the drawings at 10 is a bifocal lens comprising a major distant-vision portion 11 and a near-vision or reading portion 12, this lens being ground from a solid piece of tinted or colored glass. Since the natural curvature of the lens for multifocal vision is somewhat according to the sectional views shown in FIGURES 3 and 4 of the drawings, naturally in the case of a solid colored lens the thickness and thus the density of coloration and filtering effect will vary from the center of the lens toward the periphery and this quite uncomfortable and ill-appearing effect is suggested by the stippling in FIGURE 1 of the drawings.

On the other hand, the corrective effect of the present invention (and of course that which has been attempted to be obtained by workers in the field) is represented in FIGURE 2 of the drawings where the lens 15, including the distant-vision portion 16 and the reading portion 17 are of a uniform intensity or density of coloration.

The only attempt at solving this problem which has been brought forward up till now has been to construct a lens in the manner illustrated in FIGURE 3 of the drawings, that is, to first make a white or clear partially-processed bifocal or trifocal lens, this partially-processed lens being indicated generally by the reference numeral 20 and including the distance portion 21 and the reading portion 22. The center of curvature of the concave inner portion 23 of the lens is at the point 24, and the center of curvature of the outer surface 25 of the white refractive lens portion is at the point 26. The center of curvature of the inner surface 29 of the reading portion 22 is at the point 30.

To this optically complete white lens assembly 20 there is then applied by cementing or fusion a colored lens 35 of no power, the inner surface of the lens conforming exactly to the outer surface 25 of the white lens 20 and both the inner surface and the outer surface of the colored portion 35 being centered at the point 26, the concave and convex surfaces of the colored lens portion being therefore parallel. Thus, the colored extra lens would furnish a uniform shade or density of color.

However, in the intended solution of the problem in this manner there is added another two millimeters of thickness and a proportionately heavy weight over that of the ordinary lens of this character.

In FIGURE 4 of the drawings there is illustrated a completed lens made according to the principles of the present invention and this lens is given the general designation of 50, and comprises a colored partially-processed lens portion 51 including a distance portion 52 of no power and a reading portion 53 of the desired prescription. Then added to the inner or convex surface of the colored partial lens is a white lens portion 55 which is ground to a power which completes the distance portion of the entire lens according to the desired prescription.

In FIGURE 4 of the drawings, the center of curvature of the inner surface of the completed lens represented generally by the white or clear portion 55 is at 56, and the center of curvature of the outer surface of the white portion and of both surfaces of the colored portion, is at the point 57. Of course, the center of curvature of the surface 59 of the reading portion of the lens is located at point 60.

Now there will be described the successive steps in producing the novel lens shown in FIGURE 4.

Referring to FIGURE 5 of the drawings, an extra thick piece 70 of colored glass having a slightly higher softening point temperature than the white glass subsequently to be applied to the lens is selected and ground with a concave depression 72 of over-size diameter. Into this depression is fused by known methods an extra thick and extra large composite button 75, the lower portion 76 of which is of colored glass of the higher index of refraction needed to produce the reading field 53 of the bifocal, the upper portion 77 being of similar optical properties to the main piece 70.

By measuring accurately to tolerances within 0.2 millimeters by various already known methods, to diameters and thicknesses computed by known mathematical formulae, it is now possible to grind away the exact amount of colored glass from the inner surface of the block 70 to provide the concave surface 80 as shown in FIGURE 6, so that when the convex surface subsequently will have been ground with a paralleling curve to produce the desired diameter of reading field, there will remain a colored bifocal lens of no power for distance vision, as will be described.

The next step in the present process comprises the preparation of a convex surface 82 on a block of white glass 84 as shown in FIGURE 7 of the drawings, this surface matching the concave surface 80 of the partially-processed colored bifocal lens element shown in FIGURE 6.

FIGURE 8 shows the convex surface 82 of the white glass block 84 fused to the concave surface 80 of the partially-processed colored bifocal lens portion 70.

Next, the outer face of the compound colored bifocal lens portion is ground away, as shown in FIGURE 9, to the convex surface 88. This grinding is accomplished until the reading field portion 53 remaining from the portion 76 of the button 75 is of the desired diameter, at which point in the grinding operation the remaining thickness of the colored glass throughout will give exactly the desired uniform density of shade, but the distance portion 51 will be of no power, the inner and outer surfaces being parallel.

In FIGURE 10 of the drawings there is illustrated the final step in the preparation of the novel lens, which comprises the grinding of the concave surface 58 of the white lens block 84, the remaining part of the white portion constituting the addendum 55 to the distance area of the lens. After this grinding operation is completed, the lens will appear just as depicted in FIGURE 4 of the drawings. There is thus provided a uniform density prescription lens with no greater weight and no greater thickness than if it were an ordinary white lens of the same prescription.

Obviously, the present invention is not limited to use with a flat top reading field bifocal or trifocal but can be made equally easily with a curved top or with a completely round reading field, with any form of a composite button for reading, or with a single homogeneous button of prior art construction.

When the white and colored glasses are to be united by fusion, a special modification in the process can be pursued. It will be recalled that the colored glass has been selected with a higher softening point than the white glass, and with the extra thickness involved the problem is solved of how to delay penetration of the fusing heat so that neither the depression curve 72 (see FIGURE 5) or interface of the composite button nor the interface 80 of the white and colored portions will be distorted or aberrated. In this case the colored glass button will be placed upon a refractory block 90 as shown in FIGURE 11 of the drawings, with the white glass positioned atop the colored glass assembly.

From the foregoing it will be seen that means have been found to preserve the prescribed curvature of two surfaces of fusion in the composite lens; on the one hand by having the accurately ground component of the greater weight or mass on the bottom during the fusion process, and on the other hand seeing that the lens portions near the bottom of the stack shown in FIGURE 11 are of the higher softening point. The first-mentioned provision assures that when the thick composite button 75, consisting of the parts 76 and 77, is fused to the piece 70 as shown in FIGURE 5, the curvature of the surface 72 is preserved; and when the entire mass of colored glass, consisting of the elements 70, 76 and 77, is fused to the white glass component 84, both of the aforesaid provisions act to preserve the surface 80 from distortion, and at the same time serve to protect the already fused curved contact area 72 from deformation and aberration.

It will be understood that various changes and modifications may be made in the embodiments illustrated and described herein without departing from the scope of the invention as defined by the following claims.

Having thus described the invention, what is claimed as new and desired to be secured by Letters Patent is:

1. The process of making a colored multi-focal eyeglass lens of uniform color density and of normal thickness considering the prescribed refractive power, which process comprises preparing a colored glass component by selecting a piece of colored glass of the approximate area of the finished eyeglass lens, and adapted to provide the major portion of the distance portion of said lens, grinding a surface on said piece the curvature of said surface being that of the desired interior surface of the near-vision insert of the finished lens, preparing a thick composite button of colored glass composed of two parts arranged side by side in non-overlapping relationship and together being approximately the same area as the first-named piece, the first of said parts being of a higher index of refraction and adapted to provide the said near-vision insert, the other of said parts being of the same index of refraction as said first-named piece of colored glass and adapted to provide a small portion of said distance portion, said last-named part being complementary to said first part in filling out the full area of the button, accurately grinding a surface on the button which contains the interior surface of said near-vision insert, and placing the first-named piece and the composite button together with the two named curved surfaces in snug accurate contact with the thick massive button lowermost, applying heat to the upper portion of the stack thus formed, whereby the resulting slower softening of the lower disposed button preserves the curvature of the surface thereof which is then fused to the adjacent contacting surface of said first-named piece; then grinding a surface on the inner face of said first-named piece of the colored glass component such that when the outer button side of the component is finally ground, the distance portion of the colored component will be of no power, then fusing a clear glass component to said last-named ground surface of the colored component, grinding the outer surface of the button until the near-vision portion of the button is of the desired diameter, and finally grinding the inward surface of the clear glass component to provide only the necesary addendum to the colored distance vision portion to give it the power according to the desired prescription.

2. The process as set forth in claim 1 in which the colored glass component is thicker and thus more massive than the clear glass component and is also of a higher softening point than said clear glass component, and the thick colored component is positioned lowermost in the stack for fusion whereby the curvature of the accurately ground surface on the colored component is preserved from deformation as well as the already fused junction between the composite button and the first named piece of colored glass.

3. The process of making a colored multi-focal eyeglass lens of uniform color density and of normal thickness considering the prescribed refractive power, which process comprises preparing a colored glass component by selecting a piece of colored glass of the approximate area of the finished eyeglass lens, and adapted to provide the major portion of the distance portion of said lens, grinding a surface on said piece the curvature of said surface being that of the desired interior surface of the near-vision insert of the finished lens, preparing a composite button of colored glass composed of two parts arranged side by side in non-overlapping relationship and together being approximately the same area as the first-named piece, the first of said parts being of a higher index of refraction and adapted to provide the said near-vision insert, the other of said parts being of the same index of refraction as said first-named piece of colored glass and adapted to provide a small portion of said distance portion, said last-named part being complementary to said first part in filling out the full area of the button, accurately grinding a surface on the button which contains the interior surface of said near-vision insert, and placing the first-named piece and the composite button together with the two named curved surfaces in snug accurate contact and fusing the button and the first named piece together; then grinding a surface on the inner face of said first-named piece of the colored glass component such that when the outer button side of the component is finally ground, the distance portion of the colored component will be of no power, then fusing a clear glass component to said last-named ground surface of the colored component, the colored glass component being thicker and thus more massive than the clear glass component and also of a higher softening point than said clear glass component, and the thick colored component positioned lowermost in the stack for fusion whereby the curvature of the accurately ground surface on the colored component is preserved from deformation.

References Cited in the file of this patent

UNITED STATES PATENTS

| | | |
|---|---|---|
| 1,401,238 | Clement | Dec. 27, 1921 |
| 1,596,396 | Bugbee | Aug. 17, 1926 |
| 2,045,654 | Hubbell | June 30, 1936 |
| 2,054,166 | Reh | Sept. 15, 1936 |
| 2,112,659 | Reh | Mar. 29, 1938 |
| 2,177,021 | Hammon | Oct. 24, 1939 |
| 2,618,200 | Clave et al. | Nov. 18, 1952 |

FOREIGN PATENTS

| | | |
|---|---|---|
| 580,242 | Great Britain | Sept. 2, 1946 |